Patented Aug. 29, 1939

2,170,954

UNITED STATES PATENT OFFICE 2,170,954

SEASONING COMPOSITION

William J. Stange, Chicago, Ill., assignor to Wm. J. Stange Company, Chicago, Ill., a corporation of Illinois No Drawing. Application July 21, 1938, Serial No. 220,503

5 Claims. (Cl. 99—140)

This invention relates to a seasoning composition, and more particularly to a dry seasoning material containing extracted oleoresins and essential oils of spices mixed with an edible soluble carrier such as gelatinized starch.

In the manufacture of seasoning materials, it has been proposed to incorporate oleoresins and the distilled essences of spices with carriers such as salt or sugar in such a way that the seasoning substances form surface coatings on these crystalline carriers. It is, however, obvious that only a limited amount of flavoring substances can be carried in this manner, since there is no absorption into the crystals of sugar or salt, but merely a superficial surface adherence of the oleoresins and essential oils.

I have now found that gelatinized or "soluble" starch has a great absorbent power for the extracted oleoresins and essential oils or the distilled essences of spices, so that by the use of gelatinized starch as a carrier more concentrated and more stable seasoning compositions may be prepared. I have also found that such seasoning compositions do not tend to cake, even though gelatinized starch is itself hygroscopic, and do not require any added fixative to retain the volatile essences.

It is therefore an important object of this invention to provide an improved method for the preparation of dry, siftable seasoning materials from extracted oleoresins and essential oils of spices, or from distilled essences of spices, and gelatinized starch.

It is a further important object of this invention to provide a more concentrated, non-lumping seasoning composition by the use of a soluble, gelatinized starch as the edible, absorbent carrier for oleoresins and essential oils.

Other and further important objects of this invention will become apparent from the following description and appended claims.

The spices that may be used in the preparation of seasoning compositions embodying my invention are any of those commonly known, such as pepper, coriander, parsley, celery, thyme, bay leaves, marjoram, sage, dill, mace, cloves, cinnamon, nutmeg and the like. The spices are first ground and then subjected to an extraction with any suitable organic solvent such as alcohol, acetone, benzene, chlorinated hydrocarbons like ethylene dichloride, ether and the like. The extraction is preferably carried out at temperatures slightly below the boiling point of the solvent and preferably not over 140° F. After the soluble ingredients have all been extracted from the spice and separated from the fibers and impurities of the spice by filtration or the like, the resulting solution is evaporated, or the solvent distilled off therefrom, preferably under vacuum, to isolate the extracted flavoring principles of the spice.

In accordance with the principles of this invention, the isolated essential oils, oleoresins or other flavoring principles of spices are thoroughly intermixed with a gelatinized starch. The gelatinized starches available on the market are suitable for my purpose. The mixture may contain up to 20% or even 25% of flavoring materials, but preferably between 3% and 12% by weight. A satisfactory intermixture may be effected by the use of a ribbon-type mixer.

The intimate dry mixture of gelatinized starch and the flavoring principles of spices obtained is then ground, suitably in a hammer mill, to a fineness of particle size permitting its passage through an 80-mesh screen.

The seasoning composition thus produced is a fine powder in which the oleoresins and essential oils are present in minor proportions absorbed in and as a coating over the grains of the gelatinized starch. This powder does not tend to cake. I have also found that, due to the relatively smaller surface area of the carrier over which the flavoring principles are distributed owing to the greater absorptive power of the starch as compared with sugar or salt crystals, the flavoring principles do not tend to become dissipated by volatilization or to deteriorate so fast as when salt or sugar is used as a carrier.

When my seasoning composition is added to water, the gelatinized starch goes into solution and the flavoring principles of spices form a fine emulsion. This fact makes possible the uniform flavoring of food materials especially those containing water, with a minimum of mixing, since there are no lumps to be broken up. My seasoning composition is particularly adapted for the flavoring of soups and gravies, since the starch serves as a thickening as well as a dispersing agent.

I am aware that numerous details of the process may be varied through a wide range without departing from the principles of this invention, and I therefore do not purpose limiting the patent granted hereon otherwise than necessitated by the prior art.

I claim as my invention:

1. A seasoning composition comprising an intimate, non-caking mixture of essential oils and oleoresins of spices and a gelatinized starch.

2. A dry seasoning composition comprising a gelatinized starch in pulverized form and extracted oleoresins and essential oils of a spice substantially uniformly distributed on and absorbed by said starch particles.

3. A dry seasoning composition comprising a gelatinized starch in pulverized form and extracted oleoresins and essential oils of a spice, said oleoresins and essential oils being present in minor proportions as a coating over and absorbed by the grains of gelatinized starch.

4. A method of preparing a dry seasoning composition which comprises intermixing the extracted flavoring principles of spices and gelatinized starch and pulverizing the resulting mixture.

5. A seasoning composition consisting of an intimate mixture of essential oils and oleoresins of spices and a gelatinized starch.

WILLIAM J. STANGE.